(12) United States Patent
Myers

(10) Patent No.: US 9,880,051 B2
(45) Date of Patent: Jan. 30, 2018

(54) SEALING SYSTEM FOR OPTICAL SENSORS IN GAS TURBINE ENGINES

(71) Applicant: SIEMENS AKTIENGESELLSCHAFT, München (DE)

(72) Inventor: Gerald A. Myers, Fort Mill, SC (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 15/500,762

(22) PCT Filed: Aug. 26, 2014

(86) PCT No.: PCT/US2014/052595
§ 371 (c)(1),
(2) Date: Jan. 31, 2017

(87) PCT Pub. No.: WO2016/032433
PCT Pub. Date: Mar. 3, 2016

(65) Prior Publication Data
US 2017/0219424 A1    Aug. 3, 2017

(51) Int. Cl.
*G01M 15/14*     (2006.01)
*G01J 1/02*      (2006.01)
(Continued)

(52) U.S. Cl.
CPC .......... *G01J 1/0271* (2013.01); *F01D 11/003* (2013.01); *F01D 17/02* (2013.01); *G01J 1/0403* (2013.01); *F05D 2240/55* (2013.01)

(58) Field of Classification Search
USPC .................................................. 73/112.01
See application file for complete search history.

(56) References Cited

U.S. PATENT DOCUMENTS 5,120,129 A    6/1992    Farquharson et al.
5,146,083 A    9/1992    Zuckerwar et al.
(Continued)

FOREIGN PATENT DOCUMENTS

CN    85107047 A    7/1986
CN     1946531 A    4/2007
(Continued)

OTHER PUBLICATIONS

PCT International Search Report and Written Opinion dated May 7, 2015 corresponding to PCT Application No. PCT/US2014/052595 filed Aug. 26, 2014.

*Primary Examiner* — Eric S McCall

(57) ABSTRACT

A sealing system (20) for an optical sensor of a turbine engine that diverts and exhaust seal leakage away from the seal (22, 24) to prevent ingestion of humid air through the seal (22, 24) is disclosed. The sealing system (20) may include inner and outer optical housings (26, 28) with first and second seals (22, 24) positioned there between separating inner and outer optical housings (26, 28) radially. The sealing system (20) may include one or more leakage manifolds (30) positioned between the first and second seals (22, 24) and containing one or more manifold rings (32). The manifold ring (32) may be positioned between and in contact with the first and second seals (22, 24) enabling the first and second seals (22, 24) to form a double seal. The manifold ring (32) may also be configured to capture leakage air that has seeped past the first seal (22) and exhaust that leakage air through one or more exhaust vents (34) in the outer optical housing (28) before leaking through the sealing system (20).

19 Claims, 4 Drawing Sheets

(51) Int. Cl.
  *G01J 1/04*  (2006.01)
  *F01D 17/02* (2006.01)
  *F01D 11/00* (2006.01)

(56) References Cited

U.S. PATENT DOCUMENTS

| | | |
|---|---|---|
| 5,408,313 A | 4/1995 | Ponstingl et al. |
| 5,828,797 A | 10/1998 | Minott et al. |
| 5,906,374 A | 5/1999 | Arbuckle |
| 6,016,702 A | 1/2000 | Maron |
| 6,196,553 B1 | 3/2001 | Arab-Sadeghabadi et al. |
| 6,241,254 B1 | 6/2001 | Gromyko et al. |
| 6,439,055 B1 | 8/2002 | Maron et al. |
| 6,595,523 B1 | 7/2003 | Heinzen |
| 6,978,074 B2 | 12/2005 | Shu et al. |
| 7,128,818 B2 | 10/2006 | Khesin et al. |
| 7,338,215 B2 | 3/2008 | Reynolds |
| 7,405,818 B2 | 7/2008 | Heinzen |
| 7,502,538 B2 | 3/2009 | Brummel et al. |
| 7,772,506 B2 | 8/2010 | Suter et al. |
| 7,872,815 B2 | 1/2011 | Sonderegger et al. |
| 7,987,712 B2 | 8/2011 | Myhre et al. |
| 8,264,347 B2 | 9/2012 | Castleman |
| 2010/0321703 A1 | 12/2010 | Harpin et al. |
| 2013/0039738 A1 | 2/2013 | Rai et al. |
| 2013/0114089 A1 | 5/2013 | Jarisch et al. |
| 2013/0118183 A1* | 5/2013 | Wang ............... F01D 17/08 60/783 |
| 2013/0247574 A1 | 9/2013 | Patel et al. |
| 2016/0116670 A1* | 4/2016 | Toyserkani ........ G01D 5/35316 250/227.18 |

FOREIGN PATENT DOCUMENTS

| | | |
|---|---|---|
| CN | 102061980 A | 5/2011 |
| DE | 102004050437 A1 | 4/2006 |

* cited by examiner

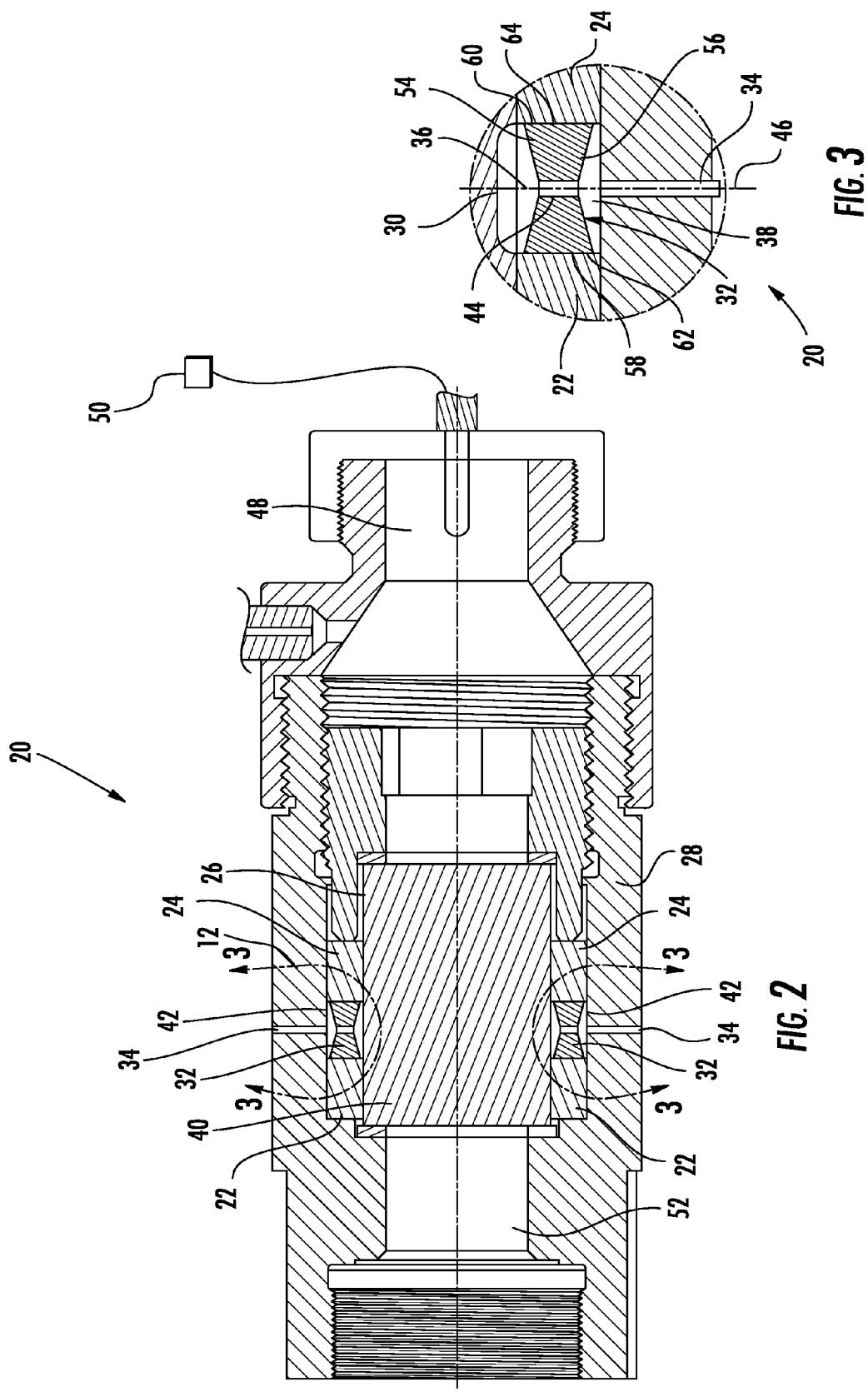

SEALING SYSTEM FOR OPTICAL SENSORS IN GAS TURBINE ENGINES

FIELD OF THE INVENTION

The present application relates to turbine engines, sealing technologies, and optical sensors, and more particularly, to a sealing system for optical sensors.

BACKGROUND

In turbine engines, optical sensors, such as those used for flame scanning in the combustion regions of the turbines, need to be able to detect a flame for safety and to ensure optimal engine operation. Currently, various existing technologies and methods for sealing such optical sensors typically allow a small leakage of humid air from the combustion region of a turbine to leak past the optical barrier for the optical sensors, such as shown in FIG. 1. A lens containment housing 10 may be releasably attached to a lens support 12 and sealed with a single pressure seal 14. The seal 14 is often susceptible to leakage. The leakage of humid air may allow for condensation to occur within the optical sensing region of the turbine, and the condensation often causes droplets or moisture to form on the optical fibers that transmit light signals to the signal processor of the optical sensing region. The droplets or moisture may cause a deterioration of light signals transmitted to the signal processor, and, as a result, may cause false trips of the turbine engine when the system incorrectly determines that a flame out condition exists when in fact the opposite is true. False trips of turbine engines often cause substantial customer dissatisfaction, loss of substantial revenue, loss of turbine availability, and loss of productivity. Furthermore, current technologies and methods are often prone to failures as well. Moreover, electrical heating, which is often used to address vapor issues, requires added complexity and substantial costs. Thus, a need exists for a more robust system that provides for improved sealing for optical sensors or flame detecting devices.

SUMMARY OF THE INVENTION

A sealing system for an optical sensor of a turbine engine that diverts and exhausts seal leakage away from the seal to prevent ingestion of humid air through the seal is disclosed. The sealing system may include inner and outer optical housings with first and second seals positioned there between separating inner and outer optical housings radially. The sealing system may include one or more leakage manifolds positioned between the first and second seals and containing one or more manifold rings. The manifold ring may be positioned between and in contact with the first and second seals enabling the first and second seals to form a double seal in which the first seal engages the inner and outer optical housings and the second seal engages the inner and outer optical housings. The manifold ring may also be configured to capture leakage air that has seeped past the first seal and exhaust that leakage air through one or more exhaust vents in the outer optical housing before leaking through the sealing system. The manifold ring may also be configured to form an inner leakage capture chamber or an outer capture chamber, or both, within the leakage manifold.

In at least one embodiment, the sealing system for an optical sensor may include an outer optical housing having a generally tubular outer configuration and an inner optical housing positioned within an inner chamber in the outer optical housing. The sealing system may also include first seal extending between the inner optical housing and the outer optical housing and a second seal extending between the inner optical housing and the outer optical housing and separated laterally from the first seal. One or more exhaust vents may extend through the outer optical housing. A manifold ring positioned between the inner optical housing and the outer optical housing and extend circumferentially around the inner optical housing, wherein the manifold ring may include one or more leak ports extending radially outward through the manifold ring. In at least one embodiment, the inner optical housing may be an optical component and the manifold ring may be positioned between the optical component and the outer optical housing.

A leakage manifold may be positioned at least partially between the inner and outer optical housings. In at least one embodiment, the manifold ring may be positioned within the leakage manifold. The leakage manifold may be cylindrical. The manifold ring may have a consistent cross-sectional area. In at least one embodiment, the exhaust vent is formed from a plurality of holes. In another embodiment, the exhaust vent may be formed from at least one slot or a plurality of slots.

In at least one embodiment, the manifold ring may have a concave inner surface. The concave inner surface of the manifold ring may extend circumferentially around the manifold ring. The manifold ring may have a concave outer surface. The concave outer surface of the manifold ring may extend circumferentially around the manifold ring. A high pressure side surface of the manifold ring is in contact with a side surface of the first seal and a low pressure side surface of the manifold ring is in contact with a side surface of the second seal. As such, the first seal is pressed against the inner and outer housing to form a first seal, and the second seal is pressed against the inner and outer housing to form a second seal, thereby forming a double seal.

During operation of the turbine engine, air flows leaking from the high pressure side of the turbine engine may occur. The sealing system may allow a minor leakage of the air flows to pass through the first seal located on the high pressure side of the turbine engine. Once the leakage air flows past the first seal, the air collected in the inner or outer leakage capture chambers of the leakage manifold. The leakage air collected in the inner leakage capture chamber may flow through one or more leak ports of the manifold ring and into outer leakage capture chamber of the leakage manifold. Once the air flows have entered the outer leakage capture chamber of the leakage manifold, the air flows may be exhausted through the outer optical housing via the one or more exhaust vents, which maintains an atmospheric pressure zone across the first seal. As a result, leakage across the first seal may be prevented from entering into the optical sensing portion of the turbine engine and creating problems leading to false trips of the turbine engine.

These and other features of the systems for sealing optical sensors are described in the following detailed description, drawings, and appended claims.

BRIEF DESCRIPTION OF THE DRAWINGS

FIG. 2 is a cross-sectional side view of a system for sealing optical sensors according to an embodiment of the present disclosure.

FIG. 3 is a detail view of a cross-sectional side view of the sealing system taken at detail line 3-3 in FIG. 2.

DETAILED DESCRIPTION OF THE INVENTION

Figure 1:
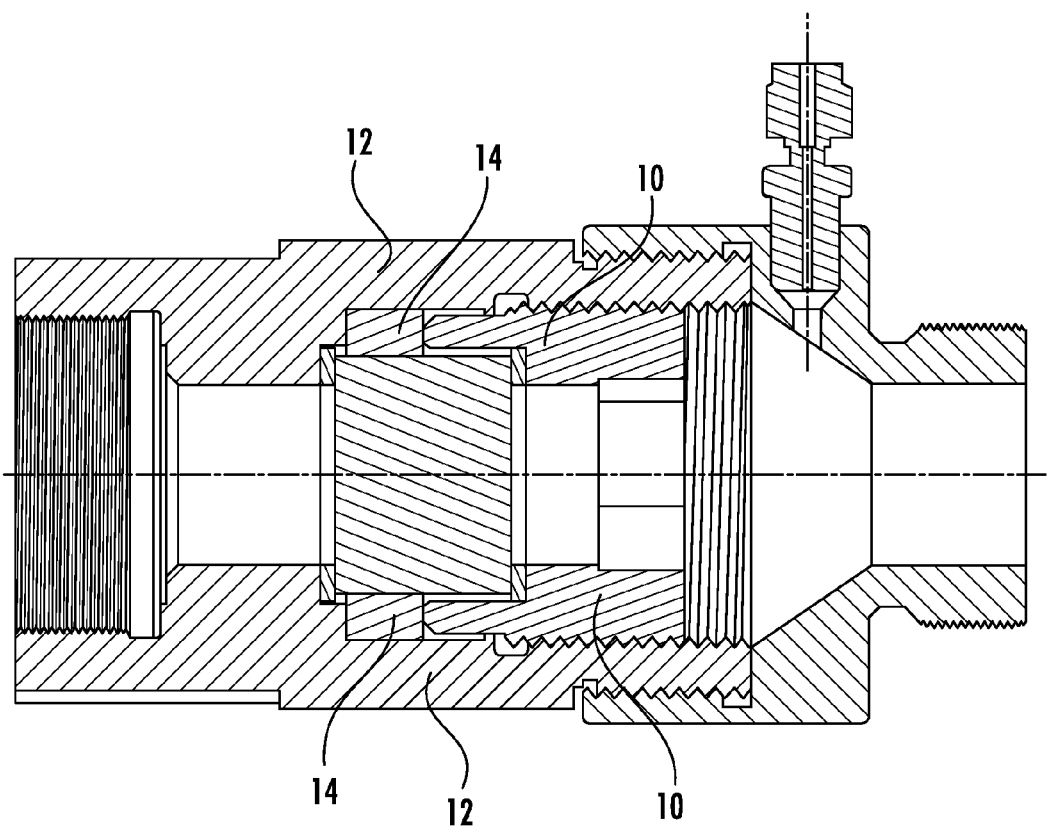
FIG. 1 is a cross-sectional side view of a prior art sealing system.

As shown in FIGS. 2-8, a sealing system 20 for an optical sensor of a turbine engine that diverts and exhaust seal leakage away from the seal 22, 24 to prevent ingestion of humid air through the seal 22, 24 is disclosed. The sealing system 20 may include inner and outer optical housings 26, 28 with first and second seals 22, 24 positioned therebetween separating inner and outer optical housings 26, 28 radially. The sealing system 20 may include one or more leakage manifolds 30 positioned between the first and second seals 22, 24 and containing one or more manifold rings 32. The manifold ring 32 may be positioned between and in contact with the first and second seals 26, 28 enabling the first and second seals 26, 28 to form a double seal in which the first seal 22 engages the inner and outer optical housings 26, 28 and the second seal 24 engages the inner and outer optical housings 26, 28. The manifold ring 32 may also be configured to capture leakage air that has seeped past the first seal 22 and exhaust that leakage air through one or more exhaust vents 34 in the outer optical housing 28 before leaking through the sealing system 20. The manifold ring 32 may also be configured to form an inner leakage capture chamber 36 or an outer leakage capture chamber 38, or both, within the leakage manifold 30.

As shown in FIGS. 2 and 3, the sealing system 20 for sealing optical sensors may be configured to provide for double sealing across the depth of an optical component 40 or other similar material. The sealing system 20 may include an inner optical housing 26 positioned within an inner chamber 42 in the outer optical housing 28. The sealing system 20 may include a first seal 22 that extends between the inner and outer optical housings 26, 28 and a second seal 24 that extends between the inner and outer optical housings 26, 28, which is separated laterally from the first seal 22. The first and second seals 22, 24 may be separated by a leakage manifold 30. The leakage manifold 30 may also be defined by the inner and outer optical housings 26, 28. The sealing system 20 may also include a manifold ring 32 that is positioned within the leakage manifold 30 between the inner and outer optical housings 26, 28. In at least one embodiment, the inner optical housing 26 may be an optical component 40, as shown in at least FIG. 8, and the manifold ring 32 may be positioned between the optical component 40 and the outer optical housing 28. The manifold ring 32 may include one or more leak ports 44 extending radially outward through the manifold ring 32.

Figures 6, 7:
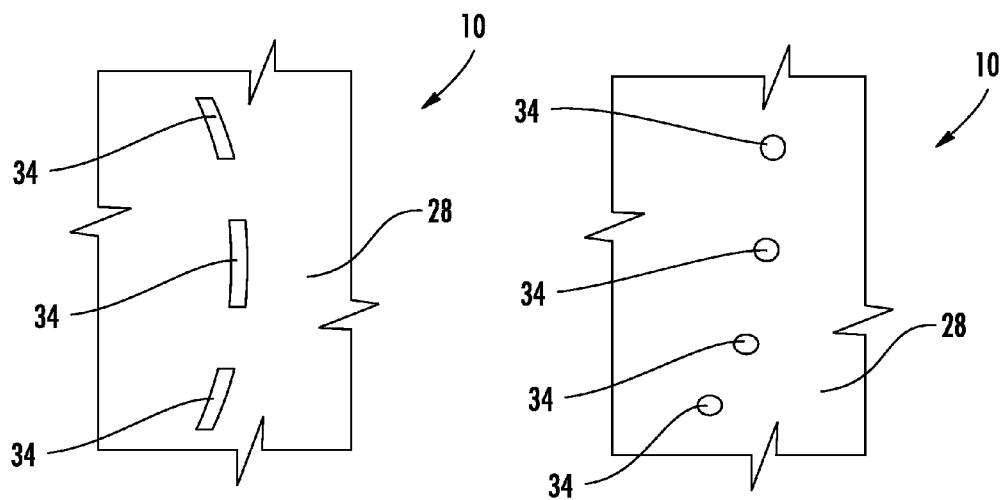
FIG. 6 is a partial view of an outer surface of the outer optical housing.
FIG. 7 is a partial view of another embodiment of the outer surface of the outer optical housing.

The sealing system 20 may also include one or more exhaust vents 34 extending through the outer optical housing 28 which provides an exhaust pathway for leakage fluids captured within the leakage manifold 30 together with the leak port 44 in the manifold ring 32. The exhaust vents 34, as shown in FIGS. 6 and 7, may be formed from a number of configurations, such as, but not limited to, a single exhaust vent 34 which may be a single hole, a hole that extends nearly 100 percent circumferentially about the outer optical housing 28, a plurality of exhaust vents 34 positioned in a row or randomly or other appropriate configuration. The exhaust vent 34, may also be formed from one or more slots, such as a plurality of circumferentially extending slots. In at least one embodiment, the one or more exhaust vents 34 may be aligned with a centerline 46 of the manifold ring 32. However, in other embodiments, the exhaust vents 34 may be positioned on other areas of the exhaust vents 34. The exhaust vent 34 may extend radially outward, as shown in FIGS. 2 and 3, or may extend nonorthogonally and nonparallel to the centerline 46 of the manifold ring 32.

In at least one embodiment, as shown in FIG. 2, the outer optical housing 28 of the sealing system 20 may have a generally tubular outer configuration however, in other embodiments, the outer optical housing 28 may have other configurations or shapes. The outer optical housing 28 may be configured to receive the inner optical housing 26 within an inner chamber 42. The inner optical housing 26 may house various portions of an optical sensing device 48. For example, the inner optical housing 26 may house the optical component 40, which may be, but is not limited to being, a glass lens. The lens allows light to pass through the sealing system 50 and contact the fibers of the fiber optic cables for transmission to one or more signal processors 50. The signal processors 50 may be used to assist in a determination of whether a flame exists in a combustion region of the turbine engine 201 based on the optical signals received from the optical fiber.

The sealing system 20 may include a pair of seals 22, 24 extending between the inner optical housing 26 and the outer optical housing 28. The first seal 22 may be separated laterally from the second seal 24, as shown in FIG. 2. The first and second seals 22, 24 may be positioned circumferentially around the inner optical housing 26, and may be positioned across the depth of the optical material 40. In at least one embodiment, the first and second seals 22, 24 may be formed from any appropriate material and may include packing material, such as, but not limited to, impregnated graphite. The packing material of the first and second seals 22, 24 may be configured to allow minor leakages of fluids, gases, or a combination thereof, to pass through on the high pressure side 52 of the turbine engine.

As shown in FIG. 3, the leakage manifold 30 may be positioned between the first seal 22 and the second seal 24. The leakage manifold 30 may be positioned radially outward of the inner optical housing 26. An outer surface of the inner optical housing 26 and an inner surface of the outer optical housing 28 may also define a portion of the leakage manifold 30. In another embodiment, an outer surface of the optical component 40 and an inner surface of the outer optical housing 28 may define a portion of the leakage manifold 30. In at least one embodiment, the leakage manifold 30 may extend circumferentially around the inner optical housing 26.

Figure 8:
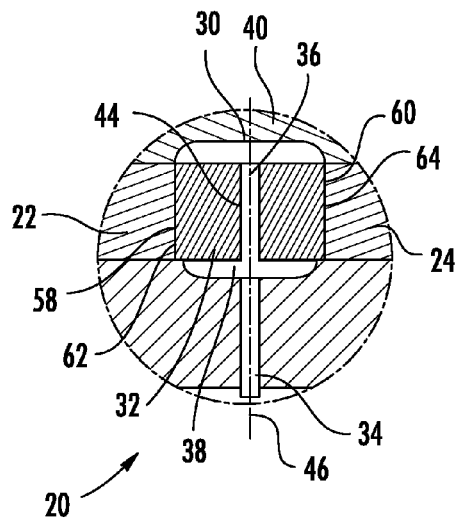
FIG. 8 is a detail view of a cross-sectional side view of an alternative embodiment of the sealing system taken at detail line 3-3 in FIG. 2.

In at least one embodiment, the manifold ring 32 of the sealing system 20 may be positioned within the leakage manifold 30 and may be utilized to keep the first and second seals 22, 24 and pressed against lateral surfaces of the outer optical housing 28 and against the inner optical housing 26 to form a double seal. The manifold ring 32 may be positioned radially outward of the inner optical housing 26 or the optical component 40. The manifold ring 32 may be positioned between the inner optical housing 26 and the outer optical housing 28. In another embodiment, the manifold ring 32 may be positioned between the optical component 40 and the outer optical housing 28. As shown in FIG. 2, in at least one embodiment, the manifold ring 32 may extend partially or circumferentially around the inner optical housing 26. In other embodiments, the manifold ring 32 may have other, non-cylindrical shapes. In at least one embodiment, the manifold ring 32 may have a consistent cross-sectional area, and may be generally cylindrical in shape. The manifold ring 32 may have an hour-glass shape, as shown in FIG. 2, which, in part defines, the inner leakage capture chamber 36 and the outer leakage capture chamber 38. In another embodiment, as shown in FIG. 8, the manifold ring 32 may have a generally rectangular shape with leakage manifolds 30 positioned radially inward and outward of the manifold ring 32.

Figure 4:
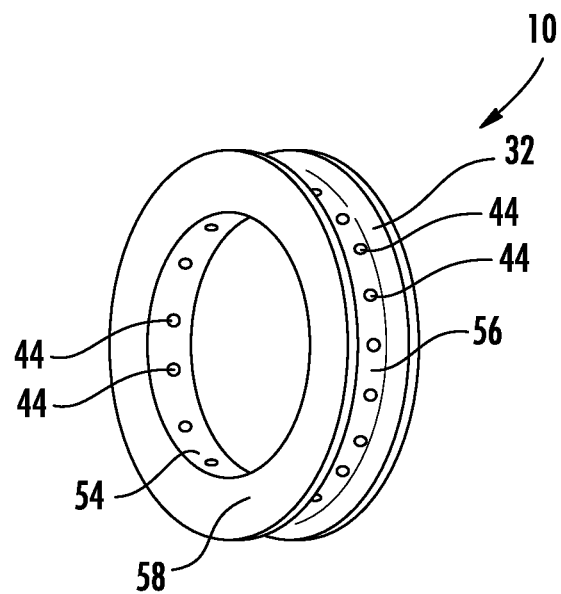
FIG. 4 is a perspective view of the manifold ring.
Figure 5:
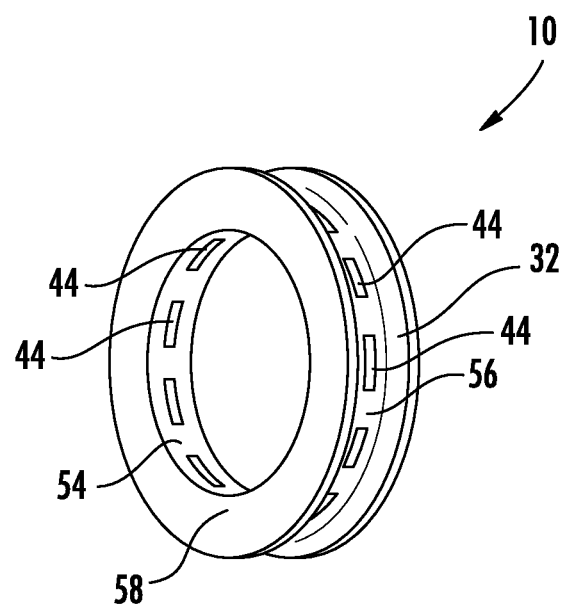
FIG. 5 is a perspective view of another embodiment of the manifold ring.

The manifold ring 32 may include one or more leak ports 44 that extend through the manifold ring 32. The manifold ring 32 may include a concave inner surface 54 and a concave outer surface 56. The concave inner and outer surfaces 54, 56 form the inner and outer leakage capture chambers 36 and 38 while enabling a high pressure side surface 58 and a low pressure side surface 60 of the manifold ring 32 to extend a width of the first and second seals 22, 24, respectively to engage a side surface 62 of the first seal 22 and a side surface 64 of the second seal 24. The manifold ring 32, as shown in FIGS. 4 and 5, may include a single leak port 44 which may be a single hole, a hole that extends nearly 100 percent circumferentially about the manifold ring 32, a plurality of leak ports 44 positioned in a row or randomly, one or more slots, or other appropriate configuration. In at least one embodiment, the one or more leak ports 44 may be positioned along a centerline 46 of the manifold ring 32. However, in other embodiments, the leak port 44 may be positioned on other areas of the manifold ring 32. The leak port 44 may extend radially outward, as shown in FIGS. 2 and 3, or may extend nonorthogonally and nonparallel to the centerline 46 of the manifold ring 32.

While FIGS. 2 and 3, illustrate specific example configurations of the various components of the sealing system 20, the sealing system 20 may include other configurations of the components, which may include using a greater or lesser number of components. For example, the sealing system 20 is illustratively shown as including a pair of seals 22, 24, a manifold ring 32, a leakage manifold 30, a leak port 44, and an exhaust vent 34. However, the sealing system 20 may include a greater number of seals 22, 24, manifold rings 32, leakage manifolds 30, leak ports 44, exhaust vents 34, or any number of any of the other components in the sealing system 20. As such, the sealing system 20 is not limited to the description or examples provided herein.

During operation of the turbine engine, air flows leaking from the high pressure side 52 of the turbine engine may occur. The sealing system 20 may allow a minor leakage of the air flows to pass through the first seal 22 located on the high pressure side 52 of the turbine engine. Once the leakage air flows past the first seal 22, the air collected in the inner or outer leakage capture chambers 36, 38 of the leakage manifold 30. The leakage air collected in the inner leakage capture chamber 36 may flow through one or more leak ports 44 of the manifold ring 32 and into outer leakage capture chamber 38 of the leakage manifold 30. Once the air flows have entered the outer leakage capture chamber 38 of the leakage manifold 30, the air flows may be exhausted through the outer optical housing 28 via the one or more exhaust vents 34, which maintains an atmospheric pressure zone across the first seal 22. As a result, leakage across the first seal 24 may be prevented from entering into the optical sensing portion 48 of the turbine engine 201 and creating problems leading to false trips of the turbine engine.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A sealing system for an optical sensor, comprising:
   an outer optical housing having a generally tubular outer configuration;
   an inner optical housing positioned within an inner chamber in the outer optical housing;
   a first seal extending between the inner optical housing and the outer optical housing;
   a second seal extending between the inner optical housing and the outer optical housing and separated laterally from the first seal;
   at least one exhaust vent extending through the outer optical housing; and
   a manifold ring positioned between the inner optical housing and the outer optical housing and circumferentially around the inner optical housing, wherein the manifold ring includes at least one leak port extending radially outward through the manifold ring.

2. The sealing system of claim 1, further comprising a leakage manifold positioned at least partially between the inner and outer optical housings, wherein the manifold ring is positioned within the leakage manifold.

3. The sealing system of claim 2, wherein the leakage manifold is cylindrical.

4. The sealing system of claim 1, wherein the manifold ring has a consistent cross-sectional area.

5. The sealing system of claim 1, wherein the at least one exhaust vent is formed from a plurality of holes.

6. The sealing system of claim 1, wherein the at least one exhaust vent is formed from at least one slot.

7. The sealing system of claim 6, wherein the at least one exhaust vent is a plurality of slots.

8. The sealing system of claim 1, wherein the manifold ring has a concave inner surface, wherein the concave inner surface of the manifold ring extends circumferentially around the manifold ring.

9. The sealing system of claim 1, wherein the manifold ring has a concave outer surface, wherein the concave outer surface of the manifold ring extends circumferentially around the manifold ring.

10. The sealing system of claim 1, wherein a high pressure side surface of the manifold ring is in contact with a side surface of the first seal and a low pressure side surface of the manifold ring is in contact with a side surface of the second seal.

11. The sealing system of claim 1, wherein the at least one leak port is positioned along a centerline of the manifold ring.

12. A sealing system for an optical sensor, comprising:
    an outer optical housing having a generally tubular outer configuration;
    an inner optical housing positioned within an inner chamber in the outer optical housing;
    a first seal extending between the inner optical housing and the outer optical housing;
    a second seal extending between the inner optical housing and the outer optical housing and separated laterally from the first seal;
    at least one exhaust vent extending through the outer optical housing;
    a manifold ring positioned between the inner optical housing and the outer optical housing and circumferentially around the inner optical housing, wherein the manifold ring includes at least one leak port extending radially outward through the manifold ring; and a leakage manifold positioned at least partially between the inner and outer optical rings, wherein the manifold ring is positioned within the leakage manifold and the leakage manifold is cylindrical.

13. The sealing system of claim 12, wherein the manifold ring has a consistent cross-sectional area.

14. The sealing system of claim 12, wherein the at least one exhaust vent is formed from a plurality of holes.

15. The sealing system of claim 12, wherein the at least one exhaust vent is formed from at least one slot.

16. The sealing system of claim 12, wherein the manifold ring has a concave inner surface, wherein the concave inner surface of the manifold ring extends circumferentially around the manifold ring, and wherein the manifold ring has a concave outer surface, wherein the concave outer surface of the manifold ring extends circumferentially around the manifold ring.

17. The sealing system of claim 12, wherein the at least one leak port is positioned along a centerline of the manifold ring.

18. A sealing system for an optical sensor, comprising:
an outer optical housing having a generally tubular outer configuration;
an inner optical housing positioned within an inner chamber in the outer optical housing;
a first seal extending between the inner optical housing and the outer optical housing;
a second seal extending between the inner optical housing and the outer optical housing and separated laterally from the first seal;
at least one exhaust vent extending through the outer optical housing;
a manifold ring positioned between the inner optical housing and the outer optical housing and circumferentially around the inner optical housing, wherein the manifold ring includes at least one leak port radially extending through the manifold ring;
a leakage manifold positioned at least partially between the inner and outer optical rings, wherein the manifold ring is positioned within the leakage manifold;
wherein the manifold ring is positioned within the leakage manifold; and
wherein the manifold ring has a concave inner surface and a concave outer surface, wherein the concave inner surface and the concave outer surface of the manifold ring extends circumferentially around the manifold ring.

19. The sealing system of claim 18, wherein a high pressure side surface of the manifold ring is in contact with a side surface of the first seal and a low pressure side surface of the manifold ring is in contact with a side surface of the second seal.

* * * * *